(12) United States Patent
Sundberg et al.

(10) Patent No.: US 8,318,060 B2
(45) Date of Patent: Nov. 27, 2012

(54) MICROENCAPSULATION OF AMINES

(75) Inventors: Donald C. Sundberg, Madbury, NH (US); John G. Tsavalas, Boston, MA (US); Jonathan K. Nguyen, Rockland, MA (US)

(73) Assignee: University of New Hampshire, Durham, NH (US)

( * ) Notice: Subject to any disclaimer, the term of this patent is extended or adjusted under 35 U.S.C. 154(b) by 466 days.

(21) Appl. No.: 12/460,537

(22) Filed: Jul. 21, 2009

(65) Prior Publication Data

US 2010/0061897 A1  Mar. 11, 2010

Related U.S. Application Data

(60) Provisional application No. 61/135,635, filed on Jul. 22, 2008.

(51) Int. Cl.
*B01J 13/02* (2006.01)

(52) U.S. Cl. .......................... 264/4.7; 264/4.1

(58) Field of Classification Search ................... 422/131; 264/4.1, 4.7
See application file for complete search history.

(56) References Cited

U.S. PATENT DOCUMENTS

| | | | | |
|---|---|---|---|---|
| 3,427,250 A * | 2/1969 | Haas et al. | ............... | 428/402.22 |
| 3,754,062 A * | 8/1973 | Kobayashi | ........................ | 264/4 |
| 3,928,230 A * | 12/1975 | Unsworth et al. | ....... | 427/213.34 |
| 4,076,774 A * | 2/1978 | Short | ................. | 264/4 |
| 4,521,352 A * | 6/1985 | Hayworth | ...................... | 264/4.3 |
| 4,857,406 A * | 8/1989 | Schwab et al. | ............ | 428/402.22 |
| 4,975,224 A * | 12/1990 | Pringle | .......................... | 588/255 |
| 5,264,315 A * | 11/1993 | Tan et al. | ................. | 430/137.12 |
| 5,357,008 A * | 10/1994 | Tsai et al. | ..................... | 525/526 |
| 5,405,558 A * | 4/1995 | Hodosawa et al. | ............ | 264/4.1 |
| 2005/0129946 A1 * | 6/2005 | Hayashi | ..................... | 428/402.2 |
| 2005/0179983 A1 * | 8/2005 | Sakai et al. | ................... | 359/296 |
| 2007/0298337 A1 * | 12/2007 | Hayashi | .......................... | 430/32 |

* cited by examiner

*Primary Examiner* — Walter D Griffin
*Assistant Examiner* — Huy-Tram Nguyen
(74) *Attorney, Agent, or Firm* — Devine, Millimet & Branch; Paul C. Remus; Kimberly A. W. Peaslee

(57) ABSTRACT

A system for microencapsulation of an amine in a polymer shell in an aqueous environment.

2 Claims, No Drawings

MICROENCAPSULATION OF AMINES

CROSS-REFERENCE TO RELATED APPLICATIONS

The present application claims the benefit of provisional patent application Ser. No. 61/135,635 filed Jul. 22, 2008, which is incorporated herein by reference.

GOVERNMENT SPONSORSHIP

The U.S. Government has a paid-up license in this invention and the right in limited circumstances to require the patent owner to license others on reasonable terms as provided for by the terms of Grant No. N000140410E93 awarded by the Office of Naval Research.

TECHNICAL FIELD

The present invention relates to a system for microencapsulation of amines. More specifically, it relates to a system for microencapsulation of an amine in a polymer shell in an aqueous environment by means of an in situ free radical solution like polymerization process.

BACKGROUND OF THE INVENTION

A microcapsule is a small sphere, or core, with a uniform wall around it. The wall, or shell, around the core is usually a polymer. The core can be a suspension of solids, liquid or other microcapsules. In one use, microcapsules allow the controlled release of the material comprising the core in response to various stimuli. Other uses may not require release of the encapsulated material. It is this characteristic that gives microcapsules so many uses in many different industries.

Thus, microcapsules can be used to form a pressure sensitive adhesive ("PSA"), particularly for use with labels and tapes. A PSA allows for a controlled release of the adhesive, only when pressure is applied. A significant advantage of a PSA over other adhesives is the ability to be completely non-sticky until pressure is applied to break the microcapsules. In addition, pre-coating screws, nuts, and bolts with microcapsules can allow for a faster and more efficient manufacturing process. Workers will not have to take time to cover screws, for example, in a liquid sealant. Instead, they will only have to insert a PSA coated screw normally. The force applied while attaching the screws will activate the PSA.

Microcapsules can also be used to create an epoxy-based self-healing coating, in other words a self-healing coating in which epoxy resin is used along with a catalyst or hardener (an amine in this case). Such a self-healing coating involves a system that embeds two sets of microcapsules distributed throughout a host coating matrix. One set of microcapsules contains an epoxy resin and the other set of microcapsules an amine based hardener. If a microcrack propagates through the coating, it ruptures both sets of microcapsules in its path, releasing their contents to mix and react with each other for self-healing. Such a self-healing coating may be significantly lower in cost than currently existing alternative self-healing coatings.

However, animes are soluble in both water and organic solvents. Thus, it is very challenging to encapsulate them. There are a number of examples in the prior art of encapsulation of some material by an amine based shell. This is the opposite of the present invention in which polymer shells encapsulate an amine in an aqueous environment. Also, U.S. Pat. No. 4,521,352 describes the encapsulation of an aqueous solution containing amine groups. However, it describes an interfacial polymerization between the amine component and another component to form a shell. The reaction to form the shell is reacting away the amine component. Furthermore, it describes the encapsulation of a water solution that has some amine groups. The present invention is a system for encapsulating an amine that does not react away any of the amine during the encapsulation.

PREFERRED EMBODIMENTS OF THE INVENTION

The present invention is a system for microencapsulation of an amine in a polymer shell in an aqueous environment by means of an in situ free radical solution like polymerization process. The two primary features of the system for microencapsulation, as discussed in more detail below, are (i) modification of the amine to an amine adduct; and (ii) phase separation of the polymer from the amine adduct during polymerization.

First, an amine is modified to an amine adduct. The amine adduct is a modified structure of the amine to limit the water solubility of the amine so that it can be encapsulated in an aqueous medium.

Second, phase separation of the polymer from the amine adduct during polymerization leads to a polymer shell engulfing a core of the amine adduct. An aqueous solution is initially prepared by mixing water and surfactant in a reactor vessel by mechanical stirring at room temperature. In a separate vessel, a fully miscible organic (oil-phase) solution of vinylic monomers, a costabilizer to prevent droplet ripening, the amine adduct, and an oil-soluble free radical initiator is prepared by mechanical stirring at room temperature. The organic solution is then well dispersed as droplets within the aqueous solution by charging the organic solution into the reactor containing the aqueous solution under constant mechanical stirring. In order to reduce the droplet size of the dispersed organic phase, more intensive mixing may also be achieved through high pressure homogenization or sonication by subjecting the reactor contents to high shear while at room temperature to break the existing oil droplets to a smaller, well dispersed, size. To prevent oxygen contamination, which can reduce initiator efficiency, the reactor is constantly purged with nitrogen, and to prevent loss of volatile monomer at higher temperatures, the reactor is equipped with a condenser. The reactor is then heated to reaction temperature allowing for the thermal dissociation of the initiator within the oil droplets and concomitant free radical based polymerization of the vinylic monomers in the presence of the amine adduct. The reactor is held at reaction temperature throughout the polymerization. Since the vinylic polymer first forms within the dispersed oil droplets, the vinylic monomers are carefully chosen for the polymerization to be suitably more polar than the amine adduct so that phase separation of the polymer from the amine adduct occurs during the polymerization accumulating the polymer at the oil/water interface of the droplets. This eventually leads to a continuous polymeric shell capsule engulfing the core of the amine adduct. On completion of the polymerization and phase separation, the reactor vessel is cooled to room temperature and mechanical stirring is stopped. The microcapsules are separated from the aqueous phase by vacuum filtration while being washed with a methanol/water solution to remove any unencapsulated amine adduct. The capsules are then dried to a free flowing powder of polymeric microcapsules engulfing an amine adduct core.

In a preferred embodiment of the present invention, the amine to be microencapsulated is an isophorone diamine that is non-crystalline. The microencapsulation maintains the diamine in liquid form within the microcapsules, with an increased viscosity (as compared to simple amines) to better match that of standard epoxy resin (for an epoxy reaction application), all the while maintaining good chemical reactivity with standard epoxy resin.

In another preferred embodiment, encapsulation of a diamine (Isophorone diamine-epoxyoctane adduct), is produced by the following procedure. In a 250 ml beaker, 128 ml of deionized water, 5.12 g poly(vinylpyrrolidone) and 0.0892 g sodium nitrite are added and well mixed until transparent. In a second 250 ml beaker, 6.4 g of MMA, 4.26 g BMA, 0.106 g hexadecane 0.106 g V-65 are well mixed. Once mixed 10.66 g of the amine adduct is added to the monomer mixture until dissolved. The contents are then placed into a 250 ml jacket reactor at room temperature. Attached to the reactor are a condenser, homogenizer (IKE® Ultra-turrax T-25), and a nitrogen gas feed line. The contents are dispersed using the homogenizer with a setting of 9500 RPM in conjunction with a magnetic stir plate and an oval shaped (30 mm in length) stir bar for 15 minutes. Once the 15 minutes has expired, the water bath (Fisher Scientific Isotemp 3016HD) is allowed to heat up to 65° C. while homogenization and magnetic stirring continues. Once the bath reaches 65° C., (ca. 35-40 minutes), homogenization is stopped and the homogenizer is removed from the reactor. The contents are allowed to react with continuous stirring (magnetic) for an additional three hours. Once cooled, the microcapsules float and are then separated from the dispersion. The capsules are then washed with a methanol/water solution during vacuum filtration. The capsules were allowed to dry at room temperature over night (ca. 18 hours), resulting in a free flowing powder.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A process for the microencapsulation of an amine adduct in a polymer shell in an aqueous environment comprising performing an in situ free radical polymerization process.

2. A process for the microencapsulation of an amine in a polymer shell in an aqueous environment comprising:
   modifying an amine to an amine adduct; and
   phase separating the polymer from the amine adduct during polymerization, thereby encapsulating the amine adduct.

* * * * *